(12) United States Patent
Zhang

(10) Patent No.: US 11,126,298 B2
(45) Date of Patent: Sep. 21, 2021

(54) TOUCH DETECTION APPARATUS, TOUCH CONTROL APPARATUS, TOUCH AND DISPLAY DRIVER INTEGRATION CHIP, TOUCH CONTROL DISPLAY APPARATUS, AND TOUCH DETECTION AND RESISTANCE MEASUREMENT METHOD

(71) Applicants: BOE Technology Group Co., Ltd., Beijing (CN); Beijing BOE Display Technology Co., Ltd., Beijing (CN)

(72) Inventor: Kan Zhang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 425 days.

(21) Appl. No.: 16/302,570

(22) PCT Filed: May 18, 2018

(86) PCT No.: PCT/CN2018/087511
§ 371 (c)(1),
(2) Date: Nov. 16, 2018

(87) PCT Pub. No.: WO2019/033809
PCT Pub. Date: Feb. 21, 2019

(65) Prior Publication Data
US 2021/0223935 A1    Jul. 22, 2021

(30) Foreign Application Priority Data

Aug. 15, 2017   (CN) .......................... 201710696912.0

(51) Int. Cl.
*G06F 3/041* (2006.01)
*G06F 3/045* (2006.01)
*G06F 3/044* (2006.01)

(52) U.S. Cl.
CPC .......... *G06F 3/04166* (2019.05); *G06F 3/045* (2013.01); *G06F 3/0412* (2013.01); *G06F 3/0446* (2019.05)

(58) Field of Classification Search
CPC combination set(s) only.
See application file for complete search history.

(56) References Cited

U.S. PATENT DOCUMENTS 8,159,462 B1    4/2012  Seguine
2008/0007534 A1  1/2008  Peng et al.
(Continued)

FOREIGN PATENT DOCUMENTS

CN    101661359 A    3/2010
CN    101937295 A    1/2011
(Continued)

OTHER PUBLICATIONS

International Search Report & Written Opinion dated Aug. 20, 2018, regarding PCT/CN2018/087511.
(Continued)

*Primary Examiner* — Robin J Mishler
(74) *Attorney, Agent, or Firm* — Intellectual Valley Law, P.C.

(57) ABSTRACT

The present application provides a touch detection apparatus. The touch detection apparatus includes a square wave generating circuit configured to generate a first square wave signal having a frequency correlated to a magnitude of a mutual capacitance at a position at which touch occurrence status is to be determined; a frequency detecting circuit connected to the square wave generating circuit and configured to detect a first frequency of the first square wave signal; and a micro-processor connected to the frequency
(Continued)

detecting circuit and configured to determine whether a touch has occurred based on the first frequency of the first square wave signal.

18 Claims, 5 Drawing Sheets

(56) References Cited

U.S. PATENT DOCUMENTS

| | | | | |
|---|---|---|---|---|
| 2010/0066693 | A1* | 3/2010 | Sato | G06F 3/03545 345/173 |
| 2010/0328257 | A1* | 12/2010 | Noguchi | G02F 1/13338 345/174 |
| 2012/0043977 | A1 | 2/2012 | Kremin et al. | |
| 2012/0133611 | A1 | 5/2012 | Chai et al. | |
| 2012/0162134 | A1 | 6/2012 | Chen et al. | |
| 2016/0018940 | A1 | 1/2016 | Lo et al. | |
| 2016/0124601 | A1* | 5/2016 | Hsiao | G06F 3/04883 345/173 |
| 2017/0038909 | A1 | 2/2017 | Urakawa | |

FOREIGN PATENT DOCUMENTS

| | | |
|---|---|---|
| CN | 102265245 B | 11/2011 |
| CN | 102541328 A | 7/2012 |
| CN | 105302394 A | 2/2016 |

OTHER PUBLICATIONS

Extended European Search Report in the European Patent Application No. 18795280.9, dated Jun. 14, 2021.

Tyagi Tushar et al., "Capacitive and resistive sensing based on compensated relaxation oscillator", 2017 6th International Conference on Computer Applications in Electrical Engineering-Recent Advances (CERA), IEEE, Oct. 5, 2017, pp. 98-102, XP033334936, DOI: 10.1109/CERA.2017.8343308.

Gasulla M et al., "The Noise Performance of a High-Speed Capacitive-Sensor Interface Based on a Relaxation Oscillator and a Fast Counter", IEEE Transactions on Instrumentation and Measurement, IEEE Service Center, vol. 54, No. 5, Oct. 1, 2005, pp. 1934-1940, XP011140101, ISSN:0018-9456, DOI: 10.1109/TIM.2005.853684.

* cited by examiner

US 11,126,298 B2

TOUCH DETECTION APPARATUS, TOUCH CONTROL APPARATUS, TOUCH AND DISPLAY DRIVER INTEGRATION CHIP, TOUCH CONTROL DISPLAY APPARATUS, AND TOUCH DETECTION AND RESISTANCE MEASUREMENT METHOD

CROSS-REFERENCE TO RELATED APPLICATION

This application is a national stage application under 35 U.S.C. § 371 of International Application No. PCT/CN2018/087511, filed May 18, 2018, which claims priority to Chinese Patent Application No. 201710696912.0, filed Aug. 15, 2017, the contents of which are incorporated by reference in the entirety.

TECHNICAL FIELD

The present invention relates to display technology, more particularly, to a touch detection apparatus, a touch control apparatus, a touch and display driver integration (TDDI) chip, a touch control display apparatus, and a touch detection and resistance measurement method.

BACKGROUND

Touch apparatuses have been widely used in many electronic devices such as mobile phones, computer display panels, touch screens, satellite navigation devices, digital cameras, etc. Examples of touch apparatuses include a mutual-capacitance touch control apparatus and a self-capacitance touch control apparatus. In a mutual-capacitance touch control apparatus, the touch electrodes include multiple touch scanning electrodes (Tx) and multiple touch sensing electrodes (Rx). In a self-capacitance touch control apparatus, the touch electrode can achieve touch control function alone. When a finger touches a point on the touch control display panel, the capacitor of the finger superimposes on the touch panel capacitor, resulting in a change in the capacitance of the touch panel capacitor. Based on the capacitance change upon a touch event, the coordinates of the first electrode and the second electrode being touched may be determined. In detecting touch events, the mutual capacitive touch display panel examines the touch scanning electrode array and the touch sensing electrode array sequentially. Touch resolution correlates with the distance between adjacent conductive channels. A smaller distance between adjacent conductive channels results in a higher touch resolution.

SUMMARY

In one aspect, the present invention provides a touch detection apparatus comprising a square wave generating circuit configured to generate a first square wave signal having a frequency correlated to a magnitude of a mutual capacitance at a position at which touch occurrence status is to be determined; a frequency detecting circuit connected to the square wave generating circuit and configured to detect a first frequency of the first square wave signal; and a micro-processor connected to the frequency detecting circuit and configured to determine whether a touch has occurred based on the first frequency of the first square wave signal.

Optionally, the micro-processor is configured to determine whether the first frequency is greater than a first threshold frequency thereby determining whether a touch has occurred; and wherein the micro-processor determines the touch has occurred when the first frequency is greater than the first threshold frequency, and determines no touch has occurred when the first frequency is equal to or less than the first threshold frequency.

Optionally, the touch detection apparatus further comprises a resistance measurement slot configured to measure a resistance of an object placed in the resistance measurement slot and electrically connected in series with two terminals of the resistance measurement slot; wherein a first terminal and a second terminal of the resistance measurement slot are electrically connected to the square wave generating circuit; the square wave generating circuit is configured to generate a second square wave signal having a frequency correlated to a magnitude of a resistance of the object; the frequency detecting circuit is configured to detect a second frequency of the second square wave signal; and the micro-processor is configured to determine the resistance of the object based on the second frequency of the second square wave signal.

Optionally, the micro-processor is configured to determine the resistance of the object by looking up a correspondence table storing resistances corresponding to various second frequencies.

Optionally, the square wave generating circuit comprises a hysteresis comparator and a resistor-capacitor (RC) charging and discharging circuit; wherein an output terminal of the hysteresis comparator is electrically connected to the frequency detecting circuit; the RC charging and discharging circuit includes a first resistor and a first capacitor; a first terminal of the first resistor is electrically connected to the output terminal of the hysteresis comparator a second terminal of the first resistor is electrically connected to an inverting input terminal of the hysteresis comparator a first terminal of the first capacitor is electrically connected to the inverting input terminal of the hysteresis comparator; and a second terminal of the first capacitor is electrically connected to a first voltage input terminal; wherein the inverting input terminal of the hysteresis comparator is electrically connected to a plurality of touch sensing electrodes.

Optionally, the touch detection apparatus further comprises a multiplexer receiver circuit configured to receive a plurality of touch signals generated in the plurality of touch sensing electrodes; a multiplexer input circuit configured to sequentially transmit the plurality of touch signals received by the multiplexer receiver circuit to the square wave generating circuit; and a timing controller connected to the multiplexer input circuit and configured to control the multiplexer input circuit to sequentially transmit the plurality of touch signals to the square wave generating circuit.

Optionally, the touch detection apparatus further comprises a resistance measurement slot configured to measure a resistance of an object placed in the resistance measurement slot and electrically connected in series with two terminals of the resistance measurement slot; wherein a first terminal of the resistance measurement slot is electrically connected to the first terminal of the first resistor; and a second terminal of the resistance measurement slot is electrically connected to the second terminal of the first resistor.

Optionally, the touch detection apparatus further comprises a first switch between the second terminal of the resistance measurement slot and the second terminal of the first resistor, and a second switch between the inverting input terminal of the hysteresis comparator and the plurality of touch sensing electrodes.

Optionally, the hysteresis comparator comprises a comparator, a second resistor, a third resistor, and a fourth resistor; a first terminal of the second resistor is electrically connected to a second voltage input terminal; a second terminal of the second resistor is electrically connected to a non-inverting input terminal of the comparator, a first terminal of the third resistor is electrically connected to a third voltage input terminal; a second terminal of the third resistor is electrically connected to an inverting input terminal of the comparator, a first terminal of the fourth resistor is electrically connected to an output terminal of the comparator and a second terminal of the fourth resistor is electrically connected to a non-inverting input terminal of the comparator.

Optionally, the frequency detecting circuit comprises a counter.

In another aspect, the present invention provides a touch control apparatus, comprising the touch detection apparatus described herein, and a touch control panel.

Optionally, the touch control apparatus is a touch control display apparatus.

Optionally, the touch control panel is a mutual capacitive touch control panel comprising a plurality of touch driving electrodes and a plurality of touch sensing electrodes; wherein the square wave generating circuit comprises a hysteresis comparator and a resistor-capacitor (RC) charging and discharging circuit; wherein an output terminal of the hysteresis comparator is electrically connected to the frequency detecting circuit; the RC charging and discharging circuit includes a first resistor and a first capacitor; a first terminal of the first resistor is electrically connected to the output terminal of the hysteresis comparator; a second terminal of the first resistor is electrically connected to an inverting input terminal of the hysteresis comparator, a first terminal of the first capacitor is electrically connected to the inverting input terminal of the hysteresis comparator; and a second terminal of the first capacitor is electrically connected to a first voltage input terminal; wherein the plurality of touch sensing electrodes are electrically connected to the inverting input terminal of the hysteresis comparator.

In another aspect, the present invention provides a touch and display driver integration (TDDI) chip, comprising a square wave generating circuit configured to generate a first square wave signal having a frequency correlated to a magnitude of a mutual capacitance at a position at which touch occurrence status is to be determined; a frequency detecting circuit connected to the square wave generating circuit and configured to detect a first frequency of the first square wave signal; and a micro-processor connected to the frequency detecting circuit and configured to determine whether a touch has occurred based on the first frequency of the first square wave signal.

Optionally, the TDDI chip further comprises a multiplexer receiver circuit configured to receive a plurality of touch signals generated in a plurality of touch sensing electrodes; a multiplexer input circuit configured to sequentially transmit the plurality of touch signals received by the multiplexer receiver circuit to the square wave generating circuit; a timing controller connected to the multiplexer input circuit and configured to control the multiplexer input circuit to sequentially transmit the plurality of touch signals to the square wave generating circuit; and a touch driving circuit for driving a plurality of touch driving electrodes.

In another aspect, the present invention provides a touch control display apparatus comprising the TDDI chip described herein.

In another aspect, the present invention provides a touch detection and resistance measurement method, comprising generating a first square wave signal having a frequency correlated to a magnitude of a mutual capacitance at a position at which a touch occurrence status is to be determined; detecting a first frequency of the first square wave signal; and determining whether a touch has occurred based on the first frequency of the first square wave signal.

Optionally, determining whether the touch has occurred comprises determining whether the first frequency is greater than a first threshold frequency; wherein it is determined that the touch has occurred when the first frequency is greater than the first threshold frequency; and it is determined that no touch has occurred when the first frequency is equal to or less than the first threshold frequency.

Optionally, the touch detection and resistance measurement method further comprises generating a second square wave signal having a frequency correlated to a magnitude of a resistance of an object placed in a resistance measurement slot and electrically connected in series with two terminals of the resistance measurement slot; detecting a second frequency of the second square wave signal; and determining the resistance of the object based on the second frequency of the second square wave signal.

Optionally, determining the resistance of the object comprises looking up a correspondence table storing resistances corresponding to various second frequencies.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a touch control panel, typically a touch occurrence is detected by detecting a change of mutual capacitance at a position at which the touch occurrence is to be determined. Typically, the change of mutual capacitance is converted into a voltage signal, which is then amplified and converted into digital signals using an analog-to-digital conversion circuit. However, this method inevitably amplifies the interfering noise signal along with the true touch signal, adversely affecting touch detection accuracy.

Accordingly, the present disclosure provides, inter alia, a novel touch detection apparatus, a touch control apparatus, a touch and display driver integration (TDDI) chip, a touch control display apparatus, and a touch detection and resistance measurement method that substantially obviate one or more of the problems due to limitations and disadvantages of the related art. In one aspect, the present disclosure provides a touch detection apparatus. In some embodiments, the touch detection apparatus includes a square wave generating circuit configured to generate a first square wave signal having a frequency correlated to a magnitude of a mutual capacitance at a position at which touch occurrence status is to be determined; a frequency detecting circuit connected to the square wave generating circuit and configured to detect a first frequency of the first square wave signal; and a micro-processor connected to the frequency detecting circuit and configured to determine whether a touch has occurred based on the first frequency of the first square wave signal.

Figure 1A:
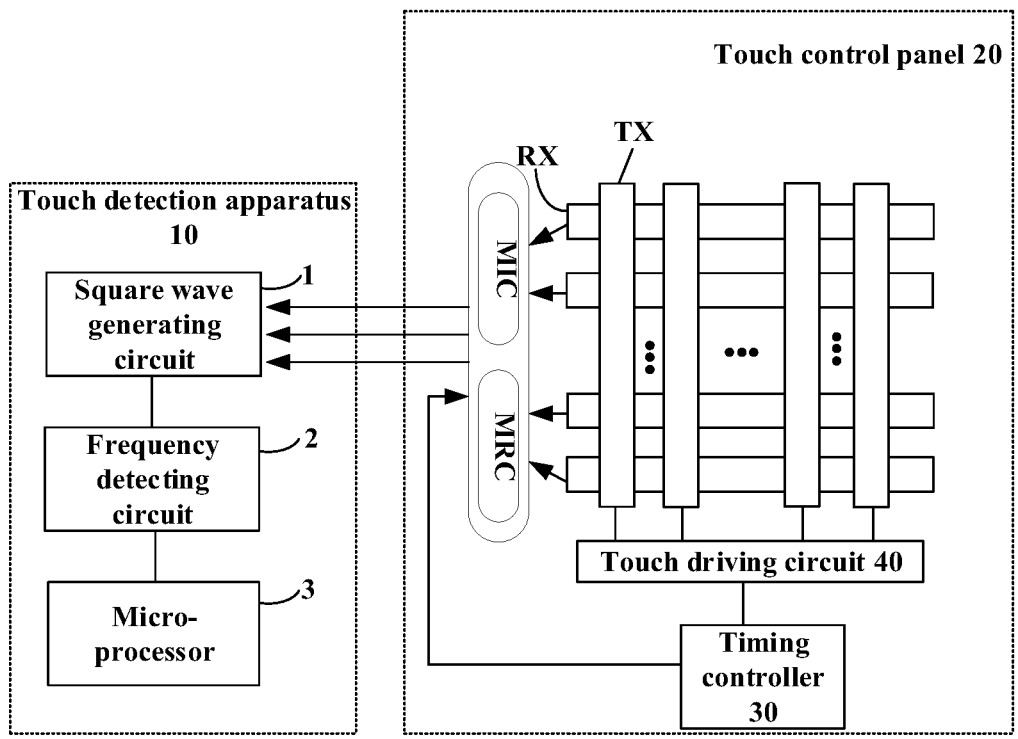
FIG. 1A is a schematic diagram illustrating the structure of a touch detection apparatus in some embodiments according to the present disclosure.
Figure 2:
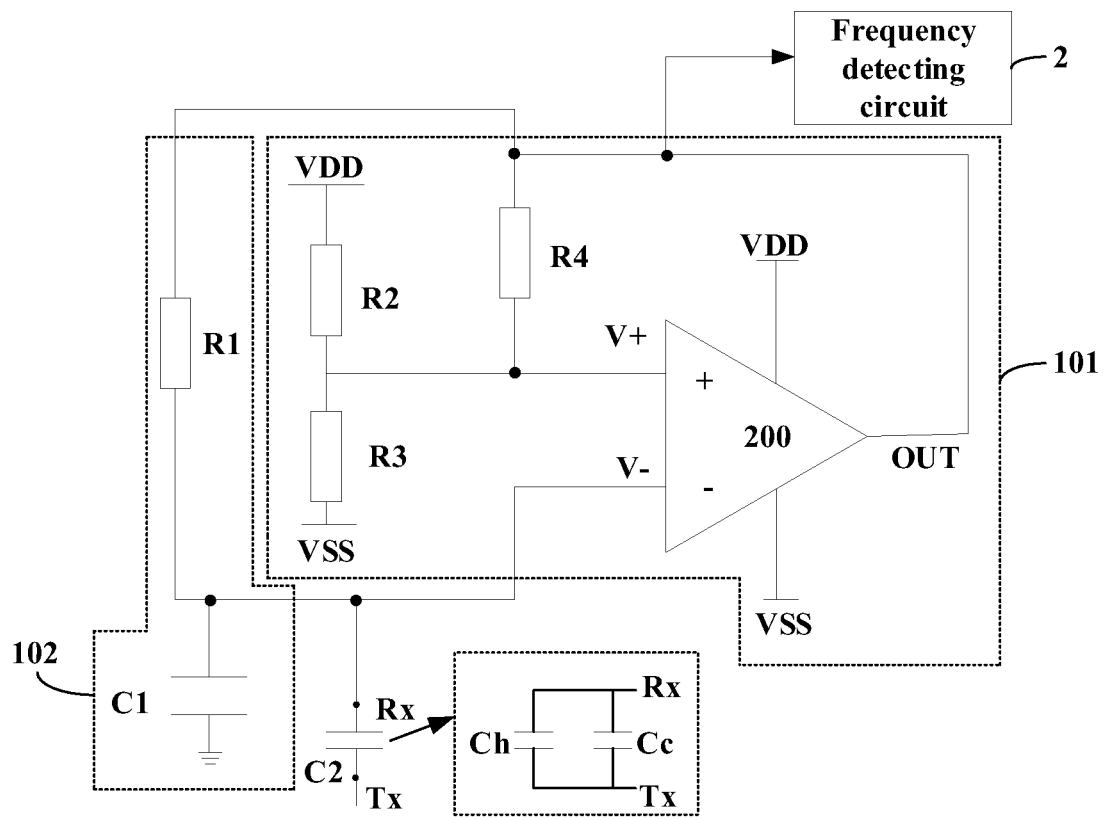
FIG. 2 is a circuit diagram of a square wave generating circuit in some embodiments according to the present disclosure.

FIG. 1A is a schematic diagram illustrating the structure of a touch detection apparatus in some embodiments according to the present disclosure. FIG. 2 is a circuit diagram of a square wave generating circuit in some embodiments according to the present disclosure. Referring to FIG. 1A and FIG. 2, the touch detection apparatus 10 in some embodiments is configured to detect a touch position of a touch on a touch control panel 20. In one example, the touch control panel 20 is a mutual capacitive touch control panel including a plurality of touch driving electrodes Tx and a plurality of touch sensing electrodes Rx crossing over each other. Various appropriate electrode structures, shapes, dimensions and designs may be used for the mutual capacitive touch control panel. The plurality of touch driving electrodes Tx are electrically connected to a touch driving circuit 40. Optionally, the touch driving circuit 40 is configured to drive a plurality of touch driving electrodes, e.g., transmitting a plurality of touch driving signals respectively to the plurality of touch driving electrodes. Optionally, the touch driving circuit 40 is integrated into a touch and display driver integration (TDDI) chip.

In some embodiments, the touch detection apparatus 10 includes a square wave generating circuit 1, a frequency detecting circuit 2, and a micro-processor 3. Optionally, the square wave generating circuit 1 is electrically connected to the plurality of touch sensing electrode Rx, and is configured to generate a first square wave signal based on a mutual capacitance C2 between one of the plurality of touch driving electrodes Tx and one of the plurality of touch sensing electrodes Rx corresponding to a touch position during a touch sensing mode. Specifically, the square wave generating circuit 1 is electrically connected to the plurality of touch sensing electrode Rx through a multiplexer receiver circuit MRC and a multiplexer input circuit MIC. Optionally, the multiplexer receiver circuit MRC is configured to receive a plurality of touch signals generated in the plurality of touch sensing electrodes Rx. The multiplexer input circuit MIC is configured to, under the control of a timing controller 30, sequentially transmit the plurality of touch signals received by the multiplexer receiver circuit MRC to the square wave generating circuit 1. By having the timing controller 30, the touch position (e.g., the coordinates of the touch position) can be ascertained by determining one of the plurality of touch driving electrodes Tx that is presently applied with a touch driving signal, and determining one of the plurality of touch sensing electrode Rx corresponding to the touch sensing signal presently input to the square wave generating circuit 1.

In the touch sensing mode, the square wave generating circuit 1 is configured to generate a first square wave signal having a frequency correlated to the magnitude of the mutual capacitance at a touch position. In some embodiments, and referring to FIG. 2, the square wave generating circuit 1 includes a hysteresis comparator 101 and a resistor-capacitor (RC) charging and discharging circuit 102. The output terminal of the hysteresis comparator 101 is electrically connected to the frequency detecting circuit 2. Optionally, the RC charging and discharging circuit 102 includes a first resistor R1 and a first capacitor C1. A first terminal of the first resistor R1 is electrically connected to the output terminal of the hysteresis comparator 101. A second terminal of the first resistor R1 is electrically connected to an inverting input terminal V− of the hysteresis comparator 101. A first terminal of the first capacitor C1 is electrically connected to the inverting input terminal V− of the hysteresis comparator 101. A second terminal of the first capacitor C1 is electrically connected to a first voltage input terminal. The plurality of touch sensing electrodes Rx are electrically connected to the inverting input terminal V− of the hysteresis comparator 101.

When one of the plurality of touch sensing electrode Rx corresponding to the touch position transmits a touch sensing signal to the square wave generating circuit 1, it is equivalent to connecting the mutual capacitance C2 to the RC charging and discharging circuit 102. The mutual capacitance C2 of the touch position is a sum of a parasitic capacitance Cc at the touch position (e.g., the parasitic capacitance between one of the plurality of touch driving electrodes Tx and one of the plurality of touch sensing electrode Rx at the touch position) and a finger-induced capacitance Ch (e.g., an induced capacitance between a finger and one of the plurality of touch sensing electrode Rx).

Optionally, the hysteresis comparator 101 is configured to generate a square wave signal, and the RC charging and discharging circuit 102 functions as a time delay means.

In some embodiments, and referring to FIG. 2, the hysteresis comparator 101 includes a comparator 200, a second resistor R2, a third resistor R3, and a fourth resistor R4. A first terminal of the second resistor R2 is electrically connected to a second voltage input terminal VDD. A second terminal of the second resistor R2 is electrically connected to a non-inverting input terminal V+ of the comparator 200. A first terminal of the third resistor R3 is electrically connected to a third voltage input terminal VSS. A second terminal of the third resistor R3 is electrically connected to an inverting input terminal V− of the comparator 200. A first terminal of the fourth resistor R4 is electrically connected to the output terminal OUT of the comparator 200. A second terminal of the fourth resistor R4 is electrically connected to the non-inverting input terminal V+ of the comparator 200.

In some embodiments, the resistances of the second resistor R2, the third resistor R3, and the fourth resistor R4 are substantially the same. When the voltage at the non-inverting input terminal V+ of the comparator 200 is greater than the voltage at the inverting input terminal V− of the comparator 200, the comparator 200 outputs a high voltage VDD. The second resistor R2 and the fourth resistor R4 are electrically connected in parallel. Based on the voltage dropping mechanism, the voltage at the second terminal of the fourth resistor R4 is approximately ⅔ VDD, i.e., the voltage at the non-inverting input terminal V+ of the comparator 200 is approximately ⅔ VDD. The output terminal OUTPUT of the comparator 200 is configured to charge the inverting input terminal V− through the RC charging and discharging circuit 102, thereby pulling up the voltage at the inverting input terminal V− until it reaches ⅔ VDD. When the voltage at the inverting input terminal V− reaches ⅔ VDD, the output terminal OUTPUT of the comparator 200 is configured to output a low voltage VSS. The second resistor R2 and the third resistor R3 are electrically connected in parallel. Based on the voltage dropping mechanism, the second terminal of the fourth resistor R4 is approximately ⅓ VDD, i.e., the voltage at the non-inverting input terminal V+ of the comparator 200 is approximately ⅓ VDD. The output terminal OUTPUT of the comparator 200 is configured to charge the non-inverting input terminal V− through the RC charging and discharging circuit 102, thereby pulling down the voltage at the inverting input terminal V− until it reaches ⅓ VDD. When the voltage at the inverting input terminal V− reaches 1 VDD, the output terminal OUTPUT of the comparator 200 is configured to output a high voltage VDD. The above-described process is then reiterated, the voltage at the inverting input terminal V− of the comparator 200 is pulled up from ⅓ VDD to ⅔ VDD, then pulled down from ⅔ VDD to ⅓ VDD, the output terminal OUTPUT of the comparator 200 outputs a high voltage signal and a low voltage signal alternately, i.e., a square wave signal. The duty cycle of the square wave signal is approximately 50%. The duty cycle of the square wave signal is determined by the resistances of the second resistor R2, the third resistor R3, and the fourth resistor R4.

In some embodiments, the resistances of at least two of the second resistor R2, the third resistor R3, and the fourth resistor R4 differ from each other. Moreover, various appropriate hysteresis comparators may be used in the present touch detection apparatus 10.

In some embodiments, the frequency of the square wave signal output from the square wave generating circuit 1 is determined by an equation of $$f = \frac{1}{2R'^{*}C'^{*}k},$$

wherein R' is an equivalent resistance of the RC charging and discharging circuit 102, C' is an equivalent capacitance of the RC charging and discharging circuit 102. The equivalent resistance of the RC charging and discharging circuit 102 is equal to the resistance of the first resistor R1. The equivalent capacitance of the RC charging and discharging circuit 102 is a sum of the first capacitance C1 and the mutual capacitance C2 of the touch position.

Figure 1B:
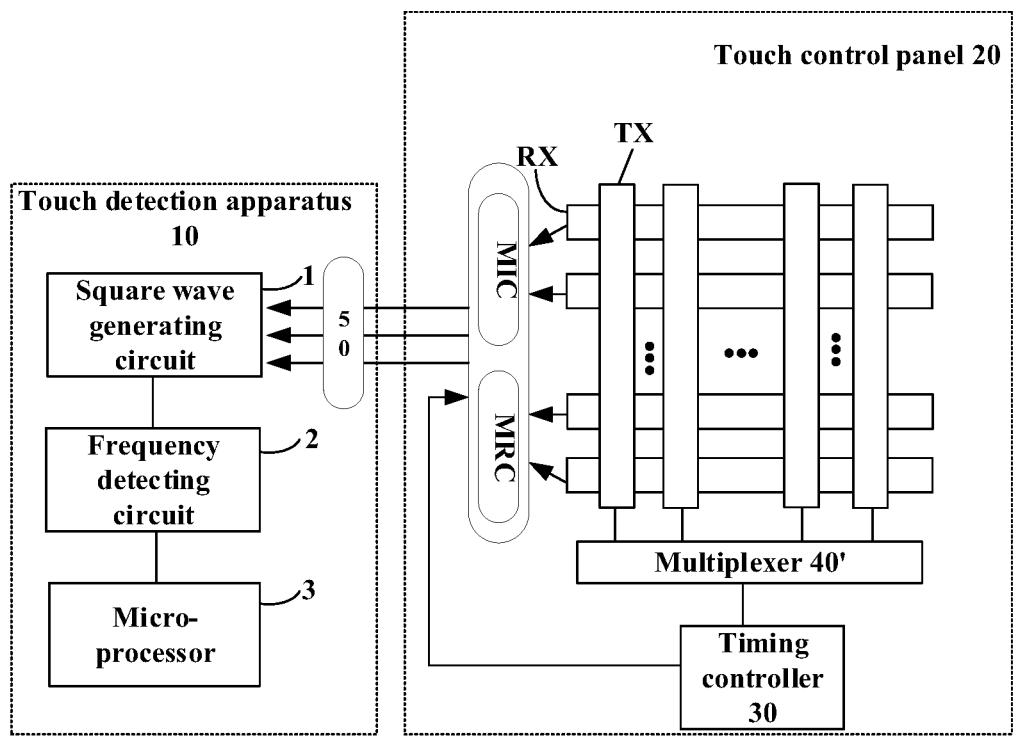
FIG. 1B is a schematic diagram illustrating the structure of a touch detection apparatus in some embodiments according to the present disclosure.

FIG. 1B is a schematic diagram illustrating the structure of a touch detection apparatus in some embodiments according to the present disclosure. Referring to FIG. 1B, the touch detection apparatus 10 in some embodiments further includes a filter 50. Optionally, the square wave generating circuit 1 is electrically connected to the plurality of touch sensing electrode Rx through a multiplexer receiver circuit MRC and a multiplexer input circuit MIC. Optionally, the multiplexer receiver circuit MRC is configured to receive a plurality of touch signals generated in the plurality of touch sensing electrodes Rx. The multiplexer input circuit MIC is configured to, under the control of a timing controller 30, sequentially transmit the plurality of touch signals received by the multiplexer receiver circuit MRC to the square wave generating circuit 1. Optionally, the filter 50 is configured to filter out high-frequency noise in the plurality of touch signals before they are sent to the square wave generating circuit 1. Optionally, the filter 50 is configured to filter out low-frequency noise in the plurality of touch signals before they are sent to the square wave generating circuit 1.

In some embodiments, the plurality of touch driving electrodes Tx are electrically connected to a multiplexer 40' for driving a plurality of touch driving electrodes. Optionally, the multiplexer 40' is configured to transmit a plurality of touch driving signals respectively to the plurality of touch driving electrodes. Optionally, the multiplexer 40' is integrated into a touch and display driver integration chip to enable a display mode and touch sensing mode.

Figure 3:
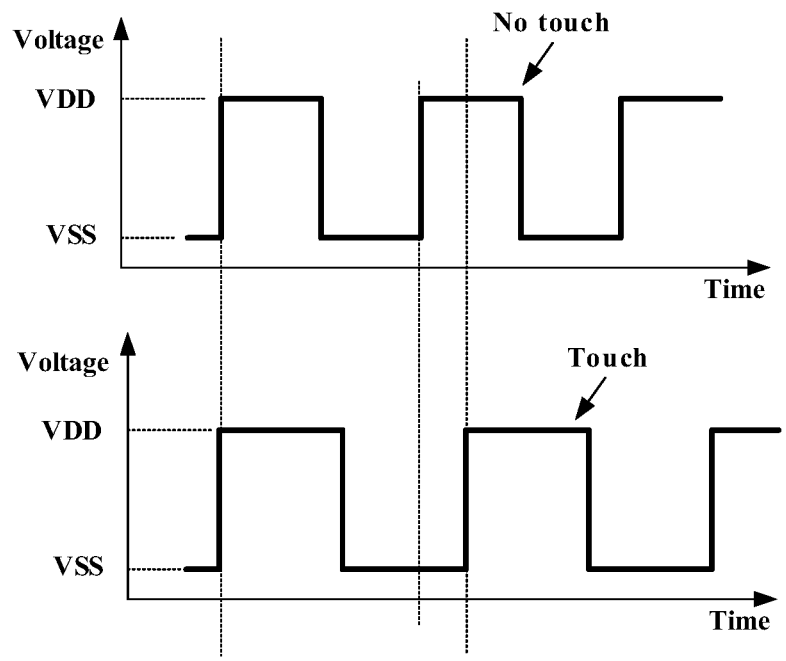
FIG. 3 illustrates a square wave output from a square wave generating circuit when no touch occurs (upper) and a square wave output from a square wave generating circuit when a touch occurs (lower).

FIG. 3 illustrates a square wave output from a square wave generating circuit when no touch occurs (upper) and a square wave output from a square wave generating circuit when a touch occurs (lower). Referring to FIG. 3, when no touch occurs, the frequency of the square wave signal output from the square wave generating circuit 1 is determined by an equation of $$f'_1 = \frac{1}{2R'^{*}C'^{*}k} = \frac{1}{2R'^{*}(C_1 + C^*_{\text{※}})^{*}k}.$$

When a touch occurs, the frequency of the square wave signal output from the square wave generating circuit 1 is determined by an equation of $$f''_1 = \frac{1}{2R'^{*}C'^{*}k} = \frac{1}{2R^*_1(C_1 + C^*_{\text{※}} + C^*_{\text{※}})^{*}k)}.$$

Thus, f1"<f1'. As compared to the frequency of the square wave signal output from the square wave generating circuit 1 when no touch occurs, the frequency of the square wave signal output from the square wave generating circuit 1 when a touch occurs decreases, i.e., the period of the square wave increases.

In some embodiments, the frequency detecting circuit 2 is electrically connected to the square wave generating circuit 1, and is configured to detect a first frequency of the first square wave signal. Optionally, the frequency detecting circuit 2 includes a counter. Optionally, the counter polls the number of complete first square wave cycles in a unit time period, thereby deriving the first frequency of the first square wave signal.

In some embodiments, the micro-processor 3 is electrically connected to the frequency detecting circuit 2, and is configured to determine whether a touch has occurred based on the first frequency of the first square wave signal. Optionally, the micro-processor 3 is configured to determine whether the first frequency is greater than a first threshold frequency. When the micro-processor 3 determines that the first frequency is greater than a first threshold frequency, it is determined that a touch has occurred. When the micro-processor 3 determines that the first frequency is equal to or less than the first threshold frequency, it is determined that no touch has occurred. Optionally, the first threshold frequency is determined empirically.

In some embodiments, under the control of the timing controller 30, the mutual capacitances C2 of a plurality of positions at the touch control panel 20 are sequentially "connected to" the square wave generating circuit 1 of the touch detection apparatus 10. The micro-processor 3 is configured to output the touch occurrence status corresponding to the plurality of positions at the touch control panel 20. Based on the touch occurrence status corresponding to the plurality of positions at the touch control panel 20, a touch position at the touch control panel 20 can be determined.

The present touch detection apparatus 10 includes a square wave generating circuit 1, a frequency detecting circuit 2, and a micro-processor 3. The square wave generating circuit 1 is configured to generate a first square wave signal having a frequency correlated to the magnitude of the mutual capacitance at the position at which the touch occurrence status is to be determined. The frequency detecting circuit 2 is configured to detect a first frequency of the first square wave signal. The micro-processor 3 configured to determine whether a touch has occurred based on the first frequency of the first square wave signal. The present touch detection apparatus 10 is capable of determine whether a touch has occurred directly based on the mutual capacitances C2 of a plurality of positions at the touch control panel 20. The touch detection is highly accurate and resistant to noise interference.

Figure 4:
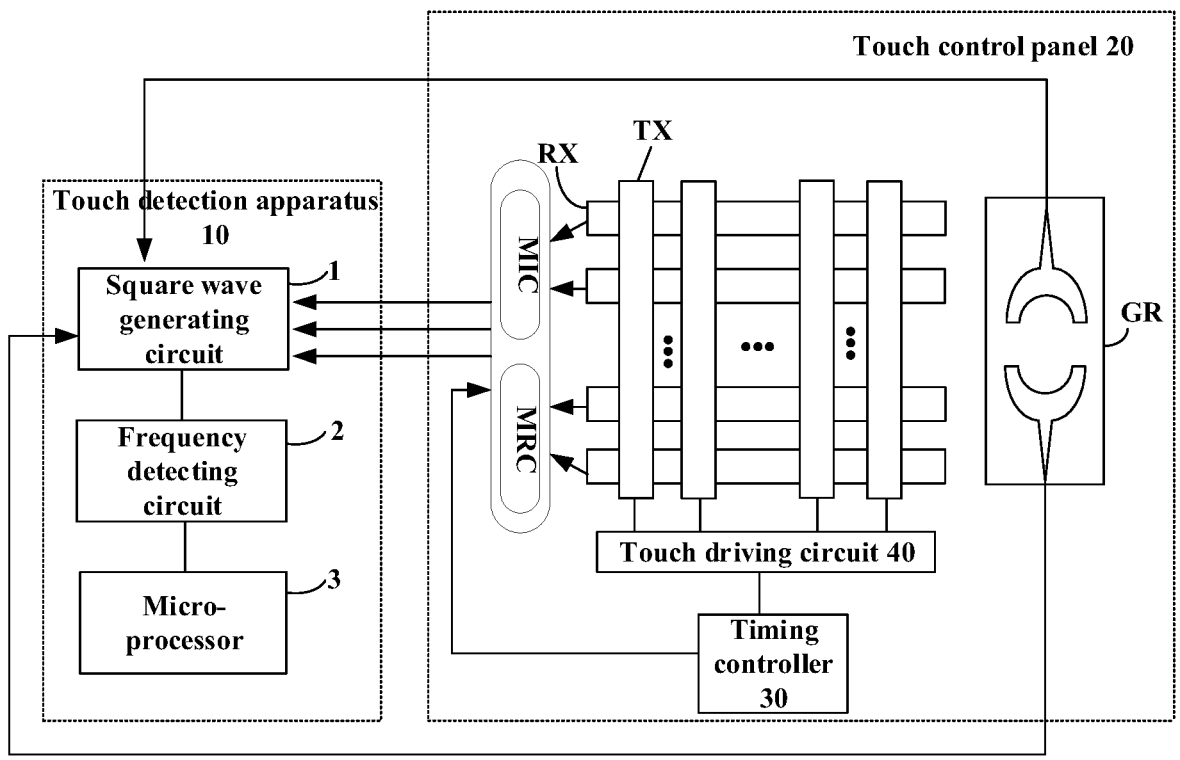
FIG. 4 is a schematic diagram illustrating the structure of a touch detection apparatus in some embodiments according to the present disclosure.
Figure 5:
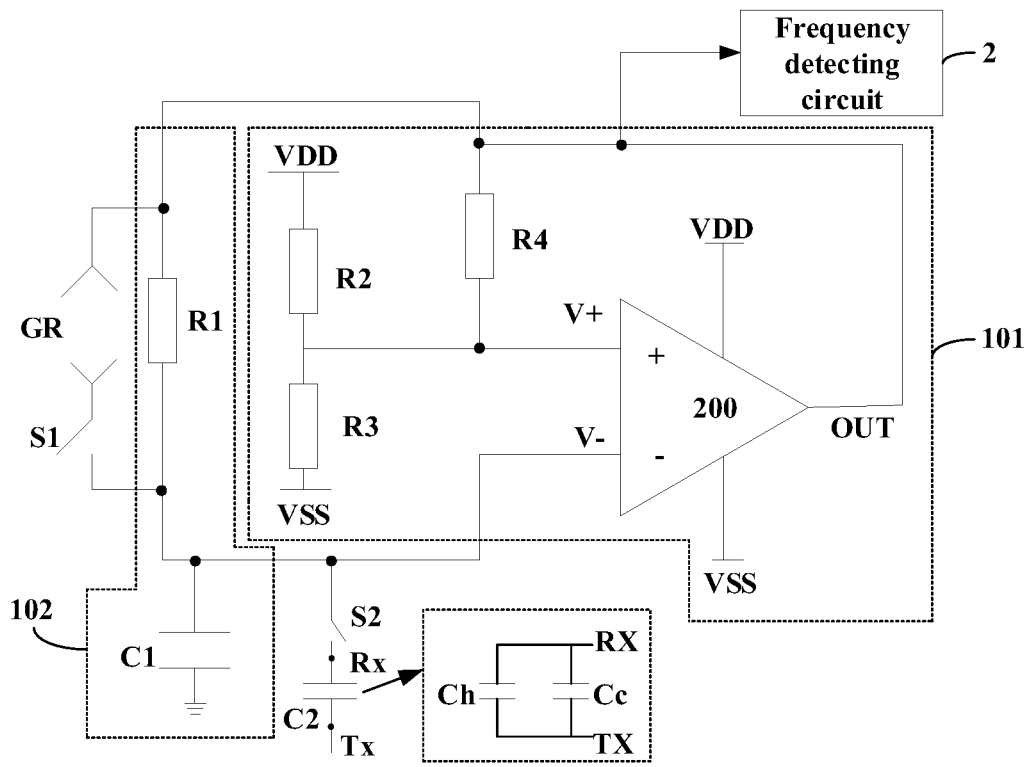
FIG. 5 is a circuit diagram of a square wave generating circuit in some embodiments according to the present disclosure.

FIG. 4 is a schematic diagram illustrating the structure of a touch detection apparatus in some embodiments according to the present disclosure. FIG. 5 is a circuit diagram of a square wave generating circuit in some embodiments according to the present disclosure. Referring to FIG. 4 and FIG. 5, the touch control panel 20 in some embodiments further includes a resistance measurement slot GR. Optionally, the resistance measurement slot GR is disposed in a peripheral region of the touch control panel 20.

In some embodiments, the touch control panel 20 is operated in a time-division driving mode. Optionally, the time-division driving mode includes a touch sensing mode and a resistance measuring mode. In the touch sensing mode, the touch detection apparatus 10 is configured to detect a touch position in the touch control panel 20. In the resistance measuring mode, the touch detection apparatus 10 is configured to measure a resistance of an object placed in the resistance measurement slot GR and electrically connected in series with two terminals of the resistance measurement slot GR.

In some embodiments, a first terminal and a second terminal of the resistance measurement slot GR are electrically connected to the square wave generating circuit 1. In the resistance measuring mode, the square wave generating circuit 1 is configured to generate a second square wave signal having a frequency correlated to the magnitude of the resistance of the object placed in the resistance measurement slot GR and electrically connected in series with two terminals of the resistance measurement slot OR. The frequency detecting circuit 2 is configured to detect a second frequency of the second square wave signal. The micro-processor 3 configured to determine the resistance of the object placed in the resistance measurement slot GR and electrically connected in series with two terminals of the resistance measurement slot GR, based on the second frequency of the second square wave signal.

Referring to FIG. 5, in some embodiments, the first terminal of the resistance measurement slot GR is electrically connected to the first terminal of the first resistor R1. The second terminal of the resistance measurement slot GR is electrically connected to the second terminal of the first resistor R1. In the resistance measuring mode, the object placed in the resistance measurement slot GR is electrically connected in parallel to the two terminals of the first resistor R1. The equivalent resistance R' of the RC charging and discharging circuit 102 is substantially the same as the total resistance of the first resistor R1 and the object placed in the resistance measurement slot OR. The equivalent capacitance C' of the RC charging and discharging circuit 102 is greater or equal to the first capacitance C1.

Figure 6:
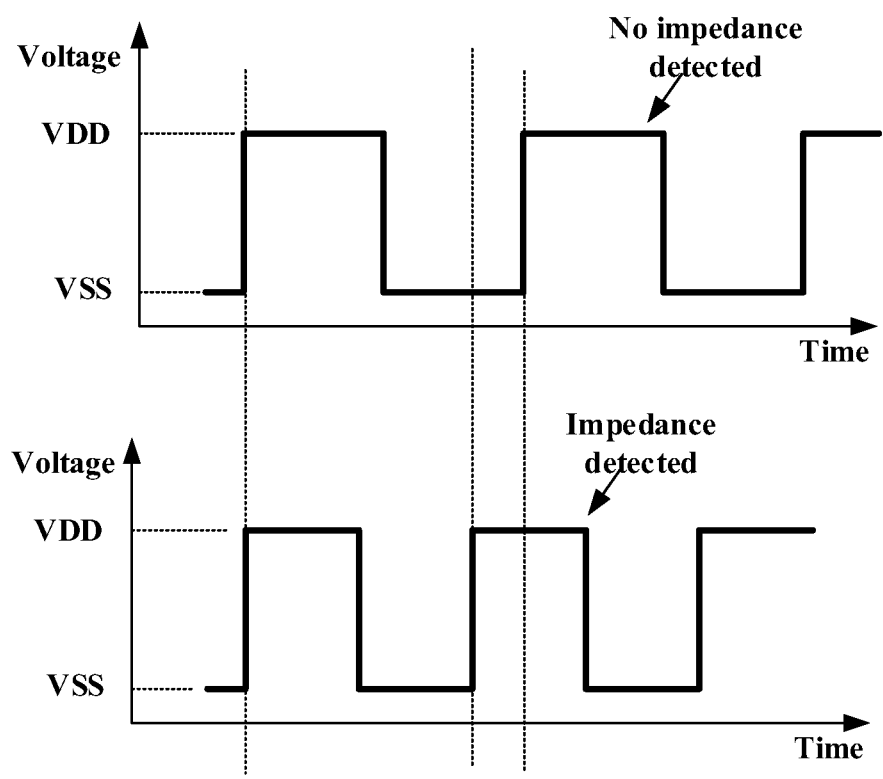
FIG. 6 illustrates a square wave output from a square wave generating circuit when no resistance detected in the resistance measurement slot (upper) and a square wave output from a square wave generating circuit when resistance is detected in the resistance measurement slot (lower).

FIG. 6 illustrates a square wave output from a square wave generating circuit when no resistance detected in the resistance measurement slot (upper) and a square wave output from a square wave generating circuit when resistance is detected in the resistance measurement slot (lower). Referring to FIG. 6, the object placed in the resistance measurement slot GR has a resistance Rx. Before the object is placed in the resistance measurement slot GR, the frequency of the square wave signal output from the s wave generating circuit 1 is determined by an equation of $$f_2' = \frac{1}{2R'^*C'^*k} = \frac{1}{2R'^*C'^*k}.$$

When the object is placed in the resistance measurement slot GR, the frequency of the square wave signal output from the square wave generating circuit 1 is determined by an equation of $$f_2'' = \frac{1}{2R'^*C'^*k} = \frac{1}{2R_1^*\left(\frac{R_x}{R_1 + R_x}\right)*C_1*k}.$$

Thus, f2">f2'. As compared to the frequency of the square wave signal output from the square wave generating circuit 1 before the object is placed in the resistance measurement slot GR, the frequency of the square wave signal output from the square wave generating circuit 1 increases when the object is placed in the resistance measurement slot GR, i.e., the period of the square wave decreases. The smaller the Rx, the greater the frequency of the square wave signal output from the square wave generating circuit 1 when the object is placed in the resistance measurement slot GR.

In some embodiments, the micro-processor 3 is configured to determine the resistance of the object placed in the resistance measurement slot GR by looking up a correspondence table storing resistances corresponding to various second frequencies. The correspondence in the correspondence table may be determined empirically.

In some embodiments, the touch control panel 20 further includes a first switch S1 between the second terminal of the resistance measurement slot GR and the second terminal of the first resistor R1, and a second switch S2 between the inverting input terminal V− of the comparator 200 and the plurality of touch sensing electrodes Rx. In the touch sensing mode, the second switch S2 is switched on (e.g., put on an ON position) and the first switch S1 is switched off (e.g., put on an OFF position). This prevents the resistance of the object placed in the resistance measurement slot GR from interfering the output frequency of the first square wave signal generated by the square wave generating circuit 1, ensuring the touch sensing accuracy. In the resistance measuring mode, the first switch S1 is switched on (e.g., put on an ON position) and the second switch S2 is switched off (e.g., put on an OFF position). This prevents the mutual capacitance between touch electrodes from interfering the output frequency of the second square wave signal generated by the square wave generating circuit 1, ensuring the resistance measuring accuracy. Optionally, the second switch S2 is a bidirectional switch.

In some embodiments, the touch detection apparatus 10 is integrated into a touch and display driver integration (TDDI) chip.

In another aspect, the present disclosure provides a TDDI chip. In some embodiments, the TDDI chip includes a square wave generating circuit configured to generate a first square wave signal having a frequency correlated to a magnitude of a mutual capacitance at a position at which touch occurrence status is to be determined; a frequency detecting circuit connected to the square wave generating circuit and configured to detect a first frequency of the first square wave signal; and a micro-processor connected to the frequency detecting circuit and configured to determine whether a touch has occurred based on the first frequency of the first square wave signal. Optionally, the micro-processor is configured to determine whether the first frequency is greater than a first threshold frequency thereby determining whether a touch has occurred. Optionally, when the first frequency is greater than the first threshold frequency, the micro-processor determines that the touch has occurred. Optionally, when the first frequency is equal to or less than the first threshold frequency, the micro-processor determines that no touch has occurred.

In some embodiments, the square wave generating circuit is configured to generate a second square wave signal having a frequency correlated to a magnitude of a resistance of an object; the frequency detecting circuit is configured to detect a second frequency of the second square wave signal; and the micro-processor is configured to determine the resistance of the object based on the second frequency of the second square wave signal. Optionally, the micro-processor is configured to determine the resistance of the object by looking up a correspondence table storing resistances corresponding to various second frequencies.

In some embodiments, the square wave generating circuit includes a hysteresis comparator and a resistor-capacitor (RC) charging and discharging circuit. Optionally, an output terminal of the hysteresis comparator is electrically connected to the frequency detecting circuit. Optionally, the RC charging and discharging circuit includes a first resistor and a first capacitor. Optionally, a first terminal of the first resistor is electrically connected to the output terminal of the hysteresis comparator; a second terminal of the first resistor is electrically connected to an inverting input terminal of the hysteresis comparator; a first terminal of the first capacitor is electrically connected to the inverting input terminal of the hysteresis comparator; and a second terminal of the first capacitor is electrically connected to a first voltage input terminal.

In some embodiments, the TDDI chip further includes a multiplexer receiver circuit configured to receive a plurality of touch signals; a multiplexer input circuit configured to sequentially transmit the plurality of touch signals received by the multiplexer receiver circuit to the square wave generating circuit; and a timing controller connected to the multiplexer input circuit and configured to control the multiplexer input circuit to sequentially transmit the plurality of touch signals to the square wave generating circuit.

In some embodiments, the TDDI chip further includes a first switch for switching on and off electrical connection to the second terminal of the first resistor; and a second switch for switching on and off electrical connection to the inverting input terminal of the hysteresis comparator.

In some embodiments, the hysteresis comparator includes a comparator, a second resistor, a third resistor, and a fourth resistor. Optionally, a first terminal of the second resistor is electrically connected to a second voltage input terminal; a second terminal of the second resistor is electrically connected to a non-inverting input terminal of the comparator; a first terminal of the third resistor is electrically connected to a third voltage input terminal; a second terminal of the third resistor is electrically connected to an inverting input terminal of the comparator; a first terminal of the fourth resistor is electrically connected to an output terminal of the comparator; and a second terminal of the fourth resistor is electrically connected to a non-inverting input terminal of the comparator.

In some embodiments, the TDDI chip further includes a touch driving circuit for driving a plurality of touch driving electrodes.

In another aspect, the present disclosure provides a touch control apparatus including a touch detection apparatus described herein. In some embodiments, the touch control apparatus is a touch control display apparatus. Examples of appropriate touch control display apparatuses include, but are not limited to, an electronic paper, a mobile phone, a tablet computer, a television, a monitor, a notebook computer, a digital album, a GPS, etc.

In another aspect, the present disclosure provides a touch detection and resistance measurement method. In some embodiments, the touch detection and resistance measurement method is implemented in a touch control apparatus described herein. In some embodiments, the touch control apparatus is operated in a time-division driving mode including a touch sensing mode and a resistance measuring mode.

Figure 7:
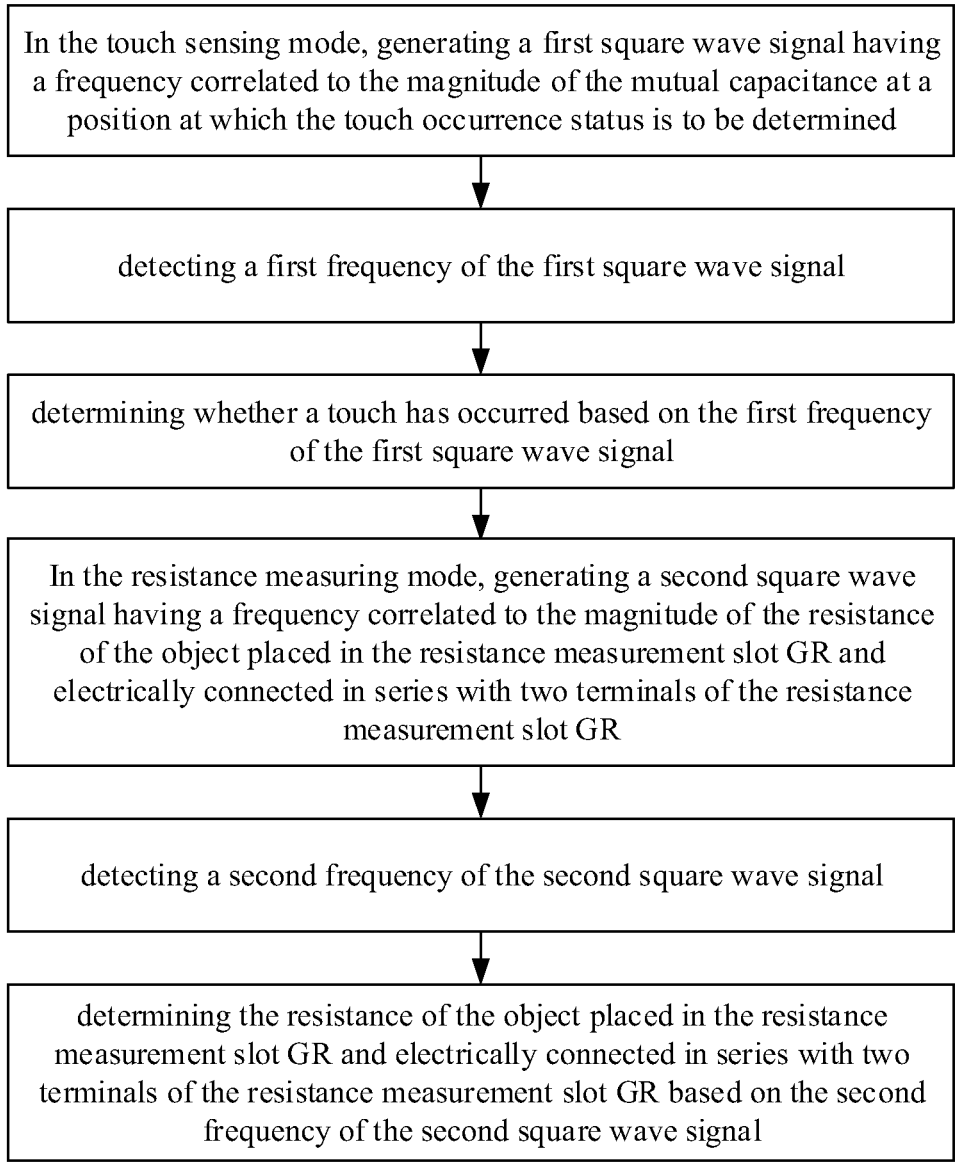
FIG. 7 is a flow chart illustrating a touch detection method in some embodiments according to the present disclosure.

In the touch sensing mode, the plurality of touch sensing electrodes Rx are electrically connected to the inverting input terminal V− of the comparator 200. FIG. 7 is a flow chart illustrating a touch detection method in some embodiments according to the present disclosure. Referring to FIG. 7, the method in the touch sensing mode includes generating a first square wave signal having a frequency correlated to the magnitude of the mutual capacitance at a position at which the touch occurrence status is to be determined, detecting a first frequency of the first square wave signal, and determining whether a touch has occurred based on the first frequency of the first square wave signal.

In some embodiments, the touch control apparatus further includes a resistance measurement slot GR. In the resistance measuring mode, the first terminal and the second terminal of the resistance measurement slot GR are electrically connected to the square wave generating circuit 1. Referring to FIG. 7, the method in the resistance measuring mode includes generating a second square wave signal having a frequency correlated to the magnitude of the resistance of the object placed in the resistance measurement slot GR and electrically connected in series with two terminals of the resistance measurement slot GR, detecting a second frequency of the second square wave signal, and determining the resistance of the object placed in the resistance measurement slot GR and electrically connected in series with two terminals of the resistance measurement slot GR based on the second frequency of the second square wave signal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch detection apparatus, comprising:
   a square wave generating circuit configured to generate a first square wave signal having a frequency correlated to a magnitude of a mutual capacitance at a position at which touch occurrence status is to be determined;
   a frequency detecting circuit connected to the square wave generating circuit and configured to detect a first frequency of the first square wave signal;
   a micro-processor connected to the frequency detecting circuit and configured to determine whether a touch has occurred based on the first frequency of the first square wave signal; and
   a resistance measurement slot configured to measure a resistance of an object placed in the resistance measurement slot and electrically connected in series with two terminals of the resistance measurement slot;
   wherein a first terminal and a second terminal of the resistance measurement slot are electrically connected to the square wave generating circuit;
   the square wave generating circuit is configured to generate a second square wave signal having a frequency correlated to a magnitude of a resistance of the object;
   the frequency detecting circuit is configured to detect a second frequency of the second square wave signal; and
   the micro-processor is configured to determine the resistance of the object based on the second frequency of the second square wave signal.

2. The touch detection apparatus of claim 1, wherein the micro-processor is configured to determine whether the first frequency is greater than a first threshold frequency thereby determining whether a touch has occurred; and
   wherein the micro-processor determines the touch has occurred when the first frequency is greater than the first threshold frequency, and determines no touch has occurred when the first frequency is equal to or less than the first threshold frequency.

3. The touch detection apparatus of claim 1, wherein the micro-processor is configured to determine the resistance of the object by looking up a correspondence table storing resistances corresponding to various second frequencies.

4. The touch detection apparatus of claim 1, wherein the square wave generating circuit comprises a hysteresis comparator and a resistor-capacitor (RC) charging and discharging circuit;
   wherein an output terminal of the hysteresis comparator is electrically connected to the frequency detecting circuit;
   the RC charging and discharging circuit includes a first resistor and a first capacitor;
   a first terminal of the first resistor is electrically connected to the output terminal of the hysteresis comparator;
   a second terminal of the first resistor is electrically connected to an inverting input terminal of the hysteresis comparator;
   a first terminal of the first capacitor is electrically connected to the inverting input terminal of the hysteresis comparator; and
   a second terminal of the first capacitor is electrically connected to a first voltage input terminal;
   wherein the inverting input terminal of the hysteresis comparator is electrically connected to a plurality of touch sensing electrodes.

5. The touch detection apparatus of claim 4, further comprising a multiplexer receiver circuit configured to receive a plurality of touch signals generated in the plurality of touch sensing electrodes;
   a multiplexer input circuit configured to sequentially transmit the plurality of touch signals received by the multiplexer receiver circuit to the square wave generating circuit; and
   a timing controller connected to the multiplexer input circuit and configured to control the multiplexer input circuit to sequentially transmit the plurality of touch signals to the square wave generating circuit.

6. The touch detection apparatus of claim 4, further comprising a resistance measurement slot configured to measure a resistance of an object placed in the resistance measurement slot and electrically connected in series with two terminals of the resistance measurement slot;
   wherein a first terminal of the resistance measurement slot is electrically connected to the first terminal of the first resistor; and
   a second terminal of the resistance measurement slot is electrically connected to the second terminal of the first resistor.

7. The touch detection apparatus of claim 6, further comprising:
   a first switch between the second terminal of the resistance measurement slot and the second terminal of the first resistor; and
   a second switch between the inverting input terminal of the hysteresis comparator and the plurality of touch sensing electrodes.

8. The touch detection apparatus of claim 4, wherein the hysteresis comparator comprises a comparator, a second resistor, a third resistor, and a fourth resistor;
   a first terminal of the second resistor is electrically connected to a second voltage input terminal;

a second terminal of the second resistor is electrically connected to a non-inverting input terminal of the comparator;

a first terminal of the third resistor is electrically connected to a third voltage input terminal;

a second terminal of the third resistor is electrically connected to an inverting input terminal of the comparator;

a first terminal of the fourth resistor is electrically connected to an output terminal of the comparator; and a second terminal of the fourth resistor is electrically connected to a non-inverting input terminal of the comparator.

9. The touch detection apparatus of claim 1, wherein the frequency detecting circuit comprises a counter.

10. A touch control apparatus, comprising the touch detection apparatus of claim 1, and a touch control panel.

11. The touch control apparatus of claim 10, wherein the touch control apparatus is a touch control display apparatus.

12. The touch control apparatus of claim 10, wherein the touch control panel is a mutual capacitive touch control panel comprising a plurality of touch driving electrodes and a plurality of touch sensing electrodes;

wherein the square wave generating circuit comprises a hysteresis comparator and a resistor-capacitor (RC) charging and discharging circuit;

wherein an output terminal of the hysteresis comparator is electrically connected to the frequency detecting circuit;

the RC charging and discharging circuit includes a first resistor and a first capacitor;

a first terminal of the first resistor is electrically connected to the output terminal of the hysteresis comparator;

a second terminal of the first resistor is electrically connected to an inverting input terminal of the hysteresis comparator;

a first terminal of the first capacitor is electrically connected to the inverting input terminal of the hysteresis comparator; and a second terminal of the first capacitor is electrically connected to a first voltage input terminal;

wherein the plurality of touch sensing electrodes are electrically connected to the inverting input terminal of the hysteresis comparator.

13. A touch and display driver integration (TDDI) chip, comprising:

a square wave generating circuit configured to generate a first square wave signal having a frequency correlated to a magnitude of a mutual capacitance at a position at which touch occurrence status is to be determined;

a frequency detecting circuit connected to the square wave generating circuit and configured to detect a first frequency of the first square wave signal; and a micro-processor connected to the frequency detecting circuit and configured to determine whether a touch has occurred based on the first frequency of the first square wave signal;

wherein the square wave generating circuit comprises a hysteresis comparator and a resistor-capacitor (RC) charging and discharging circuit;

wherein an output terminal of the hysteresis comparator is electrically connected to the frequency detecting circuit;

the RC charging and discharging circuit includes a first resistor and a first capacitor;

a first terminal of the first resistor is electrically connected to the output terminal of the hysteresis comparator;

a second terminal of the first resistor is electrically connected to an inverting input terminal of the hysteresis comparator;

a first terminal of the first capacitor is electrically connected to the inverting input terminal of the hysteresis comparator; and a second terminal of the first capacitor is electrically connected to a first voltage input terminal;

wherein the inverting input terminal of the hysteresis comparator is electrically connected to a plurality of touch sensing electrodes.

14. The TDDI chip of claim 13, further comprising a multiplexer receiver circuit configured to receive a plurality of touch signals generated in a plurality of touch sensing electrodes;

a multiplexer input circuit configured to sequentially transmit the plurality of touch signals received by the multiplexer receiver circuit to the square wave generating circuit;

a timing controller connected to the multiplexer input circuit and configured to control the multiplexer input circuit to sequentially transmit the plurality of touch signals to the square wave generating circuit; and a touch driving circuit for driving a plurality of touch driving electrodes.

15. A touch control display apparatus, comprising the TDDI chip of claim 13.

16. A touch detection and resistance measurement method, comprising:

generating a first square wave signal having a frequency correlated to a magnitude of a mutual capacitance at a position at which a touch occurrence status is to be determined;

detecting a first frequency of the first square wave signal;

determining whether a touch has occurred based on the first frequency of the first square wave signal;

generating a second square wave signal having a frequency correlated to a magnitude of a resistance of an object placed in a resistance measurement slot and electrically connected in series with two terminals of the resistance measurement slot;

detecting a second frequency of the second square wave signal; and determining the resistance of the object based on the second frequency of the second square wave signal.

17. The touch detection and resistance measurement method of claim 16, wherein determining whether the touch has occurred comprises determining whether the first frequency is greater than a first threshold frequency;

wherein it is determined that the touch has occurred when the first frequency is greater than the first threshold frequency; and it is determined that no touch has occurred when the first frequency is equal to or less than the first threshold frequency.

18. The touch detection and resistance measurement method of claim 16, wherein determining the resistance of the object comprises looking up a correspondence table storing resistances corresponding to various second frequencies.

* * * * *